Sept. 20, 1966 G. FUENTES 3,273,540
POULTRY SPUR PROTECTOR
Original Filed May 4, 1964
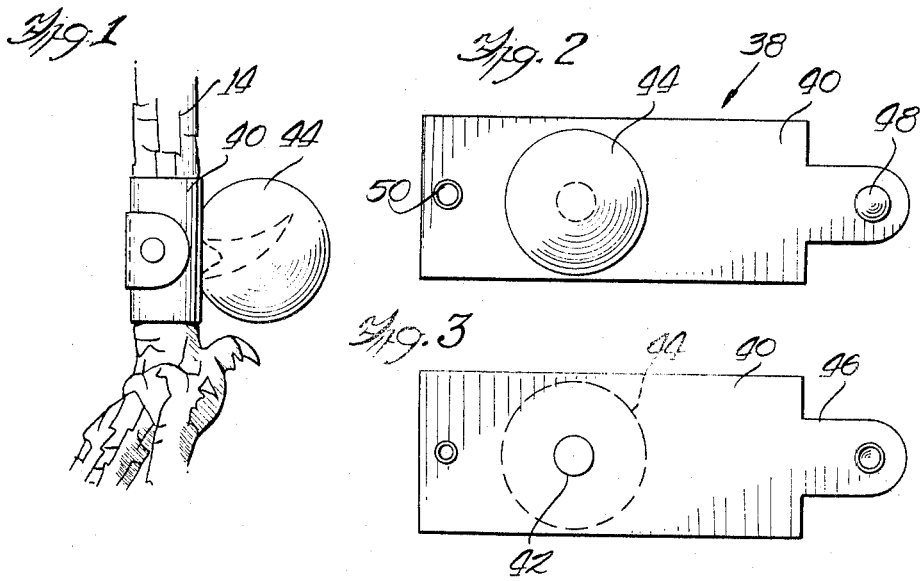
Inventor
Gabriel Fuentes, Jr.
Dominik & Stein
Attorneys

United States Patent Office 3,273,540
Patented Sept. 20, 1966

3,273,540
POULTRY SPUR PROTECTOR
Gabriel Fuentes, Jr., P.O. Box 867, Bayamon, Puerto Rico
Original application May 4, 1964, Ser. No. 364,601. Divided and this application July 19, 1965, Ser. No. 484,150
4 Claims. (Cl. 119—144)

This application is a divisional application of application Serial No. 364,601, filed May 4, 1964.

This invention relates to the protection and/or arming of poultry and involves the manufacture of prosthetic devices therefor, the fitting and installation of such devices, and means to temporarily neutralize said devices under certain circumstances. More particularly, this invention relates to the manufacture of novel prosthetic spurs for poultry, especially chickens, unique means for easily measuring the fowl whereby it can be fitted with the proper sized prosthetic spurs, to means for securing each spur to the fowl and to means for temporarily shielding these spurs to permit practice bouts or to neutralize the aggressive tendencies of such fowl during periods of socialization.

Poultry, especially chickens, and particularly roosters, normally grow a horny, spine-like growth on the back side of the leg which is called a spur. The chicken uses the spur for purposes of defense and offense. For example, in the barnyard, the chicken must defend himself against other aggressive chickens. He must also assert himself to obtain a certain stature within the social society of his fellow chickens. The reader is probably aware of the "pecking-order" within the poultry society. To accomplish such stature, the chicken uses both his beak and his spurs on the back side of his legs. With respect to the latter, he flies or swoops slightly up off the ground and beats or flails his legs at his opponent with the spurs pointed inwardly so as to drive the opponent off or subdue him. This is a natural defensive and offensive trait in all poultry.

This natural tendency has been commercialized by human beings for many years. It is more commonly known as "cock-fighting." While many states have outlawed the sport, there are still some states, teritories and possessions of the United States and foreign countries where such sport is extremely popular and is a major source of revenue. The invention here has great utility for such sport and, indeed, minimizes the occasional cruel and inhuman result of broken natural spurs during a contest.

In raising prize cocks for agricultural show purposes, there is occasional need to provide the cock with a defensive means so that he can defend himself against other competing cocks who may suddenly acquire an aggressive mood. Furthermore, there are instances in the barnyard where several cocks are needed for stud purposes. It becomes important then to arm them or disarm them completely so that there will be no domineering cock.

Heretofore, replacement prosthetic spurs were derived from natural spurs taken from "supply" roosters. Naturally, the supply rooster had to be destroyed so that the spur could be cut from his leg. This was obviously undesirable unless, of course, there was a supply available from a local poultry slaughtering house.

In such prior art technique, the individual spur, after being cut from the rooster, was cleaned, and the soft tissue at the base of the spur was removed to leave a hollow space. This hollow space was fitted upon the stud or stump of the rooster being fitted with the substitute spur.

Such a naturally derived spur was only brought to the desired shape by a long drawn-out procedure which required considerable hand skill and time. This added a great deal to its cost. Furthermore, since the spur was naturally derived, it varied widely in quality and in size. Thus, the rooster fancier not only had to hunt around for a suitable supply, but also had to match the spur obtained to fit it to his rooster. Frequently, he had to "make-do" by resorting to defective or poorly fitted spurs with consequent imminent danger to his prize rooster.

An object of this invention is to provide a more uniform synthetic spur for poultry.

Another object is to provide a means for shielding each prosthetic spur after it is fitted to provide for neutralization of the fowl's normal aggressive tendencies at that particular instance.

FIG. 1 is a pictorial view of a shield or protective glove for neutralizing the prosthetic spur.

FIG. 2 is a top view of the shield or glove when it is laid flat.

FIG. 3 is a bottom view of the shield.

Occasionally, a situation arises which necessitates neutralizing the spur fitted on the rooster. To accomplish this end, a protective glove 38 is fitted over the spur. FIGS. 1 to 3 illustrate such a protective glove. It consists of a flat elongated web or strap 40 of leather, cloth, plastic sheet, and the like. It has an orifice 42 therein which is covered by a ball 44. The ball may be hollow or may be made of sponge, either actual or synthetic, so that the prosthetic spur can be pushed into the ball 44. The tail 46 of the strap 40 has one portion 48 of a fastener, such as a snap, or a sliding buckle fastener secured thereto. The other portion 50 of the fastener is affixed to the other tail so that when strap 40 is wrapped around leg 14 of the fowl (FIG. 1) the glove can be immediately secured thereto by merely securing the two portions 48 and 50 of the fastener together.

In use, the glove is very effective. It is easily and quickly attached. And its structure insures that ball 44 will not fall off the spur. Even sharp blows are not effective to knock it off. Thus, the rooster can safely practice or be given free reign without fear of his attacking other more docile species of the flock.

It will thus be seen that the objects set forth above, among those made apparent from the preceding description, are efficiently attained, and since certain changes may be made in carrying out the above process, in the described product, and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A protective glove for poultry having spurs on its legs comprising an elongated strap with centrally located orifice therein, a spur receiving and enclosing protective shield member affixed to said strap over said orifice capable of receiving said spur when said orifice is placed over said spur and means on said strap to secure it to said leg of said poultry.

2. The protective glove of claim 1 wherein said protective shield member is a ball affixed to said strap.

3. The protective glove of claim 1 wherein said means on said strap to secure it to said leg of said poultry comprise a snap-fastener.

4. The protective glove of claim 1 wherein said strap has a length at least equal to the circumference of said leg of said poultry.

References Cited by the Examiner
UNITED STATES PATENTS

| | | | |
|---|---|---|---|
| 669,909 | 3/1901 | Young | 54—80 |
| 3,052,216 | 9/1962 | Blunt et al. | 119—144 |

FOREIGN PATENTS

| | | |
|---|---|---|
| 1,392 | 11/1890 | Great Britain. |

SAMUEL KOREN, *Primary Examiner.*

A. F. MEDBERY, *Assistant Examiner.*